UNITED STATES PATENT OFFICE.

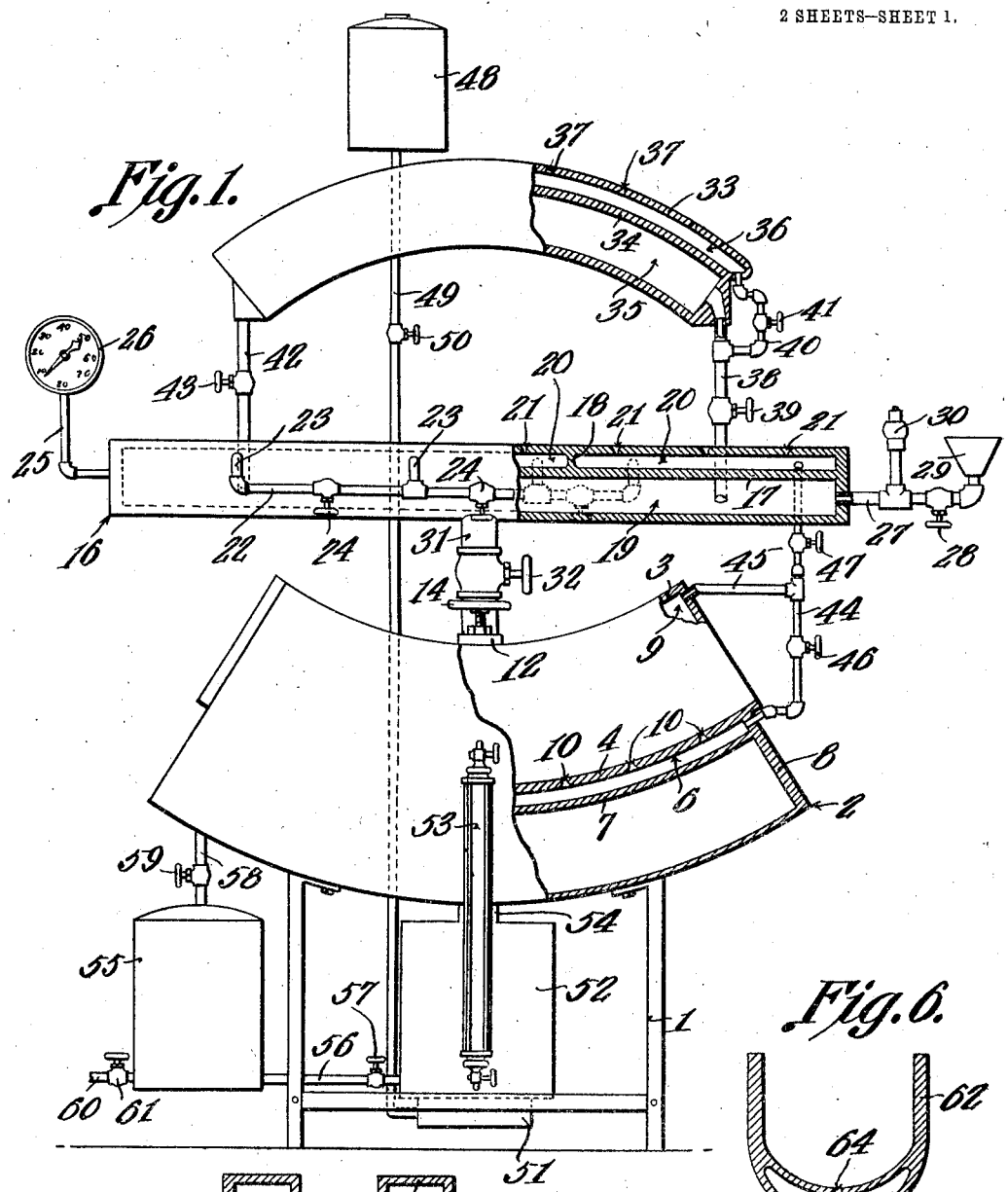

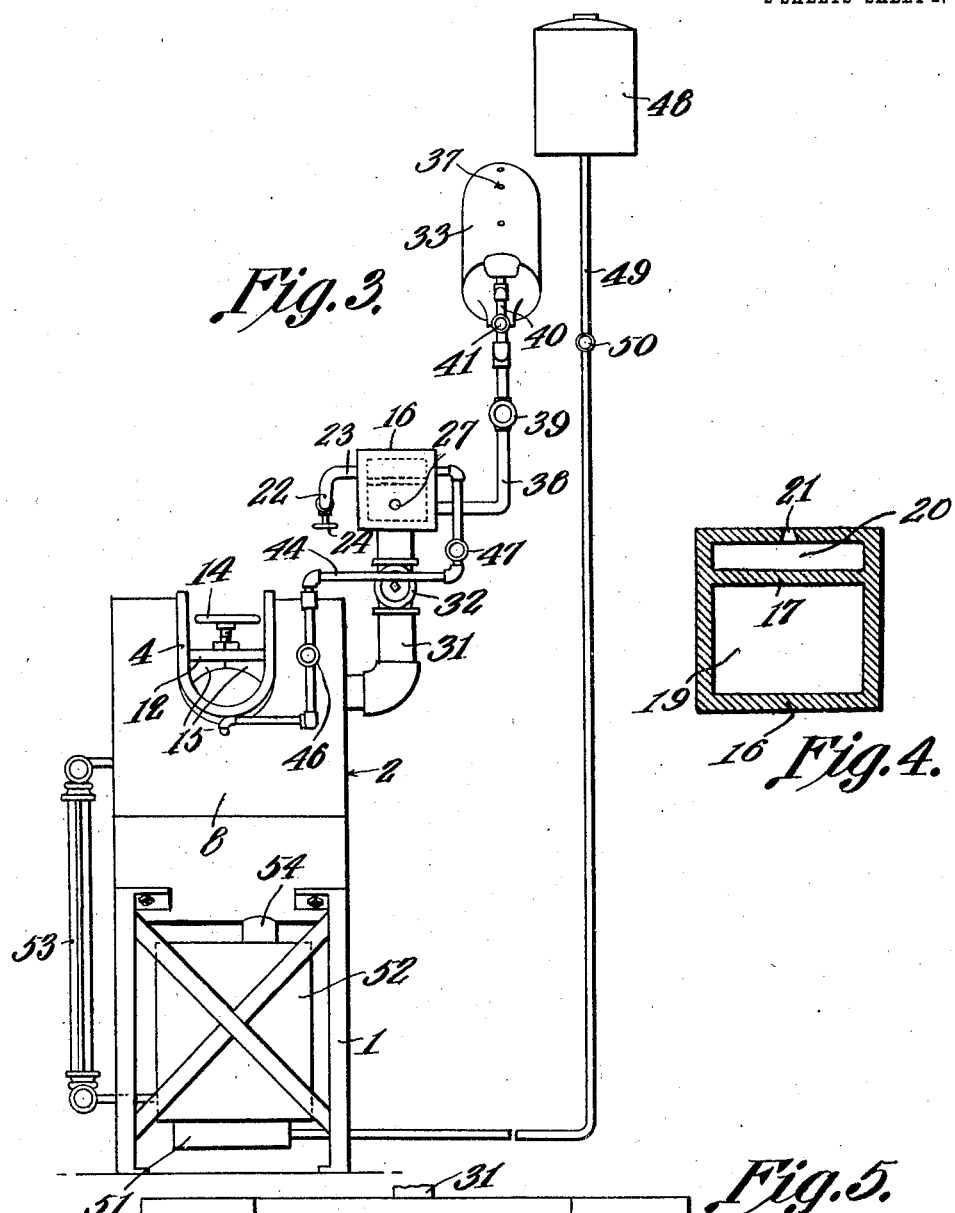

CHARLES I. DODSON, OF PITTSBURG, KANSAS.

TIRE-VULCANIZER.

1,056,013.      Specification of Letters Patent.      Patented Mar. 18, 1913.

Application filed January 29, 1912. Serial No. 674,088.

*To all whom it may concern:*

Be it known that I, CHARLES I. DODSON, a citizen of the United States, residing at Pittsburg, in the county of Crawford and State of Kansas, have invented a new and useful Tire-Vulcanizer, of which the following is a specification.

In the present invention, the vulcanizing surface is heated by steam within the vulcanizer, and a portion of the steam is permitted to escape against the tire.

The present invention makes it possible to repair the damaged part without over curing the perfect part, and without the use of a kettle. When the kettle method is employed, the tire is placed within the kettle, and the kettle is sealed, steam being admitted into the kettle under pressure, with the result that old rubber, as well as the new, is cured, the old rubber being overcured; moreover, the fabric in the original, undamaged part of the tire, is saturated with water of condensation, with the result that the fabric soon separates from the rubber. In the present instance, steam is applied to the damaged part of the tire only.

The device herein disclosed consists of three principal vulcanizers, each of which may be a one-piece structure, thus avoiding joints and joint-closures, which are subject to deterioration by heat, and by expansion and contraction.

The invention aims to provide a series of vulcanizers of novel and improved form, and to provide novel means whereby steam may be supplied to the vulcanizers, means being provided for controlling the steam supply of the several vulcanizers.

Further, the invention aims so to construct each of these vulcanizers, that the rubber will not only be heated, but be cured as well, from a common source of steam supply.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a front elevation of a device constructed in accordance with the present invention, parts being broken away and sectioned; Fig. 2 is a transverse section of the outside vulcanizer; Fig. 3 is an end elevation of the device, parts being removed; Fig. 4 is a transverse section of the tube vulcanizer; Fig. 5 is a top plan of the outside vulcanizer; and Fig. 6 is a transverse section of a supplemental outside vulcanizer, employed in connection with the outside vulcanizer shown in cross section in Fig. 2.

In carrying out the invention there is provided a supporting frame 1, upholding an outside vulcanizer 2, which is closed, so as to hold steam. Extending from the top 3 of the outside vulcanizer 2 is a trough 4. It is in the trough 4 that a blow-out repair is made, and the trough 4 may be shaped variously, to accommodate different forms of tires. In the present instance, the trough 4 is curved transversely, as shown at 5, to conform to the transverse curvature of the tire, the trough being longitudinally curved, as shown at 6, to conform approximately to the tire. Preferably, although not necessarily, the outside vulcanizer 2, in general outline, follows the longitudinal curvature 6 of the trough 4. Extended longitudinally of the trough 4, beneath the same, and sometimes formed integrally with the trough 4, is a conducting tube 7, closed at its ends by the end walls 8 of the outside vulcanizer 2. The space surrounding the trough 4 and the tube 7 constitutes the steam compartment 9 of the outside vulcanizer 2. The trough 4 is pierced by a longitudinally disposed series of outlets 10, communicating with the conducting tube 7. Extended longitudinally of the trough 4, and covering the outlets 10, is a porous diffusion member 11, which may be a piece of coarse fabric, the function of the diffusion member 11 being to secure an even distribution upon the tire, of the steam which passes from the interior of the conducting tube 7, through the outlets 10.

When the tire is disposed against the diffusion member 11, the tire is held in place by clamping mechanism of any desired sort. This clamping mechanism may include a bridge 12, extended across the trough 4, a hand screw 14 being threaded into the bridge 12, the screw 14 bearing against bead strips 15. These strips 15 are shown conventionally in Fig. 3, and they may be shaped variously, depending upon the make of the tire which is being vulcanized. The bead strips 15 are removable and interchangeable.

The invention further includes a tube vulcanizer 16, located above the outside vulcanizer 2, and being preferably straight from end to end, and of rectangular cross section, as shown in Fig. 4. Extended longitudinally of the tube vulcanizer 16 is a primary partition 17. Extended from the primary partition 17 to the top of the tube vulcanizer 16 are secondary partitions 18. The space below the primary partition 17 constitutes an accumulation chamber 19, and the spaces between the secondary partitions 18, above the partition 17, constitute diffusion chambers 20. The upper face of the tube vulcanizer 16 is provided with a series of outlets 21, opening into the several diffusion chambers 20. A main pipe 22 extends longitudinally of the tube vulcanizer 16, upon the outside of the same, there being branches 23 projecting from the main pipe 22, each of which branches communicates with one of the diffusion chambers 20. Interposed in the main pipe 22, between the branches 23, are valves 24. Projecting from one end of the tube vulcanizer 16 is a supporting pipe 25, carrying a pressure gage 26. Projecting from the opposite end of the tube vulcanizer 16 is a filling pipe 27, into which a valve 28 is interposed, there being a filling funnel 29 at one end of the pipe 27. A safety valve 30 is interposed in the filling pipe 27.

A connecting pipe 31 enters the rear wall of the outside vulcanizer 2, the pipe 31 entering the bottom of the tube vulcanizer 16. A valve 32 is interposed in the pipe 31.

Disposed above the tube vulcanizer 16 is an inside vulcanizer 33. The inside vulcanizer 33 is preferably of circular cross section, and is upwardly arched. Extended longitudinally of the inside vulcanizer 33 is a partition 34, dividing the interior of the vulcanizer into a lower accumulation compartment 35, and an upper diffusion compartment 36. In the top of the inside vulcanizer 33 are outlets 37 communicating with the diffusion compartment 36.

A pipe 38 leads from the accumulation compartment 19 of the tube vulcanizer 16 to one end of the accumulation compartment 35 of the inside vulcanizer 33. In this pipe 38 is interposed a valve 39. A pipe 40 communicates with the pipe 38 and enters one end of the diffusion compartment 36 of the inside vulcanizer 33. A valve 41 is located in the pipe 40. A pipe 42 communicates with the accumulation compartment 19 of the tube vulcanizer 16, and enters the opposite end of the accumulation compartment 35 of the inside vulcanizer, a valve 43 being interposed in the pipe 42. A pipe 44 leads from one end of the diffusion chamber 20 of the tube vulcanizer 16, through the end wall 8 of the outside vulcanizer tube, and communicates with the interior of the conducting tube 7 which is located below the trough 4. A pipe 45 branches off from the pipe 44 and enters the steam compartment 9 of the outside vulcanizer 2. A valve 46 is interposed in the pipe 44, between the pipe 45 and the outside vulcanizer 2, a valve 47 being interposed in the pipe 44, between the pipe 45 and the tube vulcanizer 16.

Steam may be generated for the several vulcanizers, in any desired manner. In the present instance, a fuel reservoir 48 is located above the inside vulcanizer 33, and from this reservoir a pipe 49 extends downwardly, a valve 50 being interposed in the pipe 49. The pipe 49 communicates with a burner 51, located below a boiler 52, supported by the frame 1 below the outside vulcanizer 2. A gage glass 53 connects the boiler 52 with the steam compartment 9 of the outside vulcanizer 2. Communication is established between the boiler 52 and the steam compartment 9 of the outside vulcanizer 2, through the medium of a pipe 54.

The invention may also include a reservoir 55, which may contain either steam or water. A pipe 56 leads from the reservoir 55 to the boiler 52, the pipe 56 being equipped with a valve 57. A pipe 58 forms a communication between the reservoir 55 and the compartment 9 of the outside vulcanizer 2, there being a valve 59 in the pipe 58. A pipe 60 enters the reservoir 55, a valve 61 being interposed in the pipe 60.

The invention may also include a supplemental trough 62, shown in Fig. 6, the trough 62 having a steam chamber 63, corresponding to the tube 7 of the trough 4. In the trough 62 there are openings 64, communicating with the chamber 63. The manner of using the supplemental trough 62 will be referred to hereinafter.

Preliminary to the description of the operation of the device, it may be stated that the outside vulcanizer 2 is employed for blowout repair work, the vulcanizer 16 being employed for curing inner tubes, and the vulcanizer 33 being employed for curing the inside of the tire or casing.

When the outside vulcanizer 2 is to be used, the tire or casing is placed in the trough 4, in contact with the porous diffusion member 11, in the manner hereinbefore described. The valve 47 is closed, the valve 32 is closed, and the valve 46 is opened. The steam, proceeding from the boiler 52 will pass by way of the pipe 54 into the steam chamber 9 of the outside vulcanizer 2. The trough 4 will thus be heated. The steam which is in the main compartment or chamber 9 will pass by way of the pipe 45, through the pipe 44 and into the conducting tube 7, the steam proceeding through the outlets 10, into the diffusion member 11, which will distribute the steam evenly along the outer face of the tire or casing. The outflow through the openings 10, may be controlled by manipulating the valve 46. When the steam enters the tube 7, through the pipe 44, the steam in the tube 7 will be heated by reason of the presence of the surrounding steam in the compartment 9.

If desired, the supplemental trough 62, shown in Fig. 6, may be placed within the trough 4, for the purpose of reducing the size thereof, the pipe 44 being connected with one end of the chamber 63. The trough 62 may be of any desired shape, to enable a single device to operate upon tires of different cross-sectional areas.

When it is desired to use the tube vulcanizer 16, the valves 39 and 43 are closed, the valve 46 is closed, the valve 47 is opened, the valve 32 is opened, and the valve 28 is closed. The steam will thereupon pass from the boiler 52, by way of the pipe 54 into the steam chamber 9 of the outside vulcanizer 2, and from the steam chamber 9, by way of the pipe 45 into the pipe 44, and thence into one of the diffusion chambers 20 of the tube vulcanizer 16. From the chamber 20 under discussion, steam may be supplied to other chambers 20, by means of the main pipe 22 and the branches 23, the valves 24 being opened one after another, according to the length of the tube which is being treated. The steam will also pass from the chamber 9 of the outside vulcanizer 2, by way of the pipe 31 into the accumulation chamber 19 of the tube culcanizer 16. The pressure will be indicated by the gage 26, and excessive pressure will be relieved by means of the safety valve 30. It will, of course, be understood that the steam within the diffusion chambers 20 of the tube vulcanizer 16 will pass outwardly through the openings 21.

When it is desired to use the inside vulcanizer 33, the valve 32 is opened, the valve 47 is closed, the valves 39 and 43 are opened, whereupon the steam will pass from the boiler 52, by way of the pipe 54, into the chamber 9 of the outside vulcanizer 2, and thence by way of the pipe 31, into the accumulation chamber 19 of the tube vulcanizer, and from the chamber 19 by way of the pipes 38 and 42 into the accumulation compartment 35 of the inside vulcanizer 33. The valve 41 may be manipulated, opening the pipe 40, and permitting steam to pass from the pipe 38 into the diffusion compartment 36 of the inside vulcanizer, and from the compartment 36, by way of the openings 37, against the tire or other structure which is being vulcanized. The steam supply to the compartment 36 is controlled by the valve 41, the valve 47 exercising a similar construction with respect to the chamber 20.

In order to fill the boiler 52 with water, the valve 28 may be opened, water being introduced into the pipe 27 through the funnel 29, the water traversing the chamber 19 into vulcanizer 16, and passing thence by way of the pipe 31 into the chamber 9 of the outside vulcanizer 2, and from the chamber 9 by way of the pipe 54 into the boiler 52. The boiler 52 may be heated by means of the burner 51, fuel being carried from the tank 48 to the burner, by means of the pipe 49. If desired, steam from an outside source of supply is passed through the pipe 60 into the reservoir 55, the valve 59 being closed, and from the reservoir 55 by way of the pipe 56 into the boiler 52, the valve 57 being opened. If desired, water may be introduced into the reservoir 55 by means of the pipe 60, the valves 57 and 59 being opened, when desired, whereupon the pressure within the compartment 9 of the outside vulcanizer 2 will cause the water to flow through the pipe 56 into the boiler 52, the valve 61 being closed when the pressure within the boiler 52 is greater than the head of water which supplies the pipe 60.

Having thus described the invention what is claimed is:—

1. A device of the class described comprising a steam-holding casing; a trough extended into the casing; a tube extended along the bottom of the trough, there being an opening leading from the tube into the trough; means for supplying steam to the casing; means for conducting steam from the casing to the tube; and a steam control interposed in the steam-conducting means.

2. A device of the class described comprising a casing having a longitudinal partition defining an accumulation compartment at one side of the casing, there being transverse partitions connected with the longitudinal partition, and defining a plurality of diffusion compartments at the other side of the casing, each diffusion compartment having an outlet; means for supplying steam to the accumulating compartment; means for supplying steam to one diffusion compartment; means for establishing a communication between said diffusion compartment and an adjoining diffusion compartment; and a steam-control interposed in the last named means.

3. A device of the class described comprising a casing having a longitudinal partition defining an accumulation compartment at one side of the casing, there being transverse partitions connected with the longitudinal partition and defining a plurality of diffusion compartments at the other side of the casing, each diffusion compartment having an outlet; means for supplying steam to the accumulation compartment; means for supplying steam to one diffusion compartment; a pipe connecting said diffusion compartment with another diffusion compartment; and a valve interposed in the pipe.

4. A device of the class described comprising a steam-holding casing; a trough depending into the casing; a tube extended along the bottom of the trough, there being an opening leading from the tube into the trough; a second casing having a longitudinal partition defining an accumulation compartment at one side of the casing and a diffusion compartment at the other side of the casing, the diffusion compartment being provided with an outlet; a pipe leading from the diffusion compartment to the tube; a pipe leading from the first mentioned pipe into the first mentioned casing; valves interposed in the first mentioned pipe, upon opposite sides of the last mentioned pipe; and a connection between the first mentioned casing and the accumulation compartment of the second casing.

5. A device of the class described comprising a steam-holding casing; a trough depending into the casing; a tube extended along the bottom of the trough, there being an opening leading from the tube into the trough; a second casing having a longitudinal partition defining an accumulation compartment at one side of the casing, there being transverse partitions connected with the longitudinal partition and defining a plurality of diffusion compartments at the other side of the casing, each diffusion compartment having an outlet; means for establishing a communication between one diffusion compartment and another diffusion compartment; a steam-control interposed in said means; a conduit between the first mentioned casing and the accumulation compartment; a connection between one diffusion compartment and the tube; a second connection leading from the first connection into the first mentioned casing; and valves interposed in the first specified connection, on opposite sides of the second specified connection.

6. A device of the class described comprising a primary steam-holding casing; a secondary tubular casing; longitudinal partitions in the casings, defining an accumulation chamber and a diffusion chamber in each casing, each diffusion chamber being provided with an outlet discharging against the article to be vulcanized; means for supplying steam to both chambers of the primary casing; a connection between the accumulation chamber of the primary casing and the accumulation chamber of the secondary casing; a valve in said connection; a second connection between the first mentioned connection and the diffusion chamber of the secondary casing; and a valve interposed in the second communication.

7. A device of the class described comprising a primary tubular casing; a secondary tubular casing; longitudinal partitions in the casings defining an accumulation chamber and a diffusion chamber in each casing, each diffusion chamber being provided with an outlet, there being partitions dividing the diffusion chamber of the primary casing into a plurality of parts; a pipe connecting one of said parts with another of said parts; a valve interposed in said pipe; a pipe leading from the accumulation chamber of the primary casing into the accumulation chamber of the secondary casing; a pipe leading from the last mentioned pipe into the diffusion chamber of the secondary casing; and valves interposed in both of the last mentioned pipes.

8. A device of the class described comprising a casing; a trough depending into the casing; a tube extended along the bottom of the trough, there being an opening leading from the tube into the trough; a primary tubular casing; a secondary tubular casing; longitudinal partitions in the casings, defining an accumulation chamber and a diffusion chamber in each of the primary and secondary casings; a pipe connecting the first mentioned casing with the accumulation chamber of the primary casing; a valve interposed in said pipe; a conducting pipe leading from the diffusion chamber of the primary casing into the tube; a branch pipe leading from the conducting pipe into the first mentioned casing; valves in the conducting pipe upon both sides of the branch pipe; a main pipe leading from the accumulation chamber of the primary casing into the accumulation chamber of the secondary casing; an auxiliary pipe leading from the main pipe into the diffusion chamber of the secondary casing; and valves interposed in the main and auxiliary pipes.

In testimony that I claim the foregoing as my own, I have hereto affixed my signature in the presence of two witnesses.

CHARLES I. DODSON.

Witnesses:
O. T. CROPPERS,
M. B. ZOLLARS.

---

Copies of this patent may be obtained for five cents each, by addressing the "Commissioner of Patents, Washington, D. C."